United States Patent [19]
Estelle et al.

[11] Patent Number: 5,502,597
[45] Date of Patent: Mar. 26, 1996

[54] WIDE-ANGLE PHOTOGRAPHIC LENS SYSTEM AND A PHOTOGRAPHIC CAMERA

[75] Inventors: Lee R. Estelle; Joel S. Lawther, both of Rochester, N.Y.

[73] Assignee: Eastman Kodak Company, Rochester, N.Y.

[21] Appl. No.: 191,223

[22] Filed: Feb. 2, 1994

[51] Int. Cl.$^6$ ............... G02B 9/04; G02B 9/06; G02B 13/18; G03B 37/00

[52] U.S. Cl. ............ 359/793; 354/96; 359/794; 359/717; 359/739

[58] Field of Search ................... 359/793, 794, 359/795, 708, 717, 739; 354/96

[56] References Cited

U.S. PATENT DOCUMENTS

| | | | |
|---|---|---|---|
| 3,045,547 | 7/1962 | Albrecht | 359/753 |
| 4,381,888 | 5/1983 | Momiyama | 359/749 |
| 4,412,726 | 11/1983 | Horimoto | 359/752 |
| 4,431,273 | 2/1984 | Nakamura | 359/708 |
| 4,525,038 | 6/1985 | Muller | 359/753 |
| 4,995,710 | 2/1991 | Suzuki et al. | 359/793 |

*Primary Examiner*—Scott J. Sugarman
*Attorney, Agent, or Firm*—Svetlana Z. Short

[57] ABSTRACT

A lens system 10 suitable for use in imaging on film F in panoramic cameras 100. The lens system 10 comprising an aperture stop ST, a front lens unit 20 located behind the aperture stop ST, the front lens unit 20 including a triplet; and a rear lens unit 30, preferably a meniscus lens element 32, located behind the front lens unit 20. The triplet consists of two negative power lens elements 22, 26 and a positive power lens element 24 located between the negative power lens elements 22, 26.

32 Claims, 1 Drawing Sheet

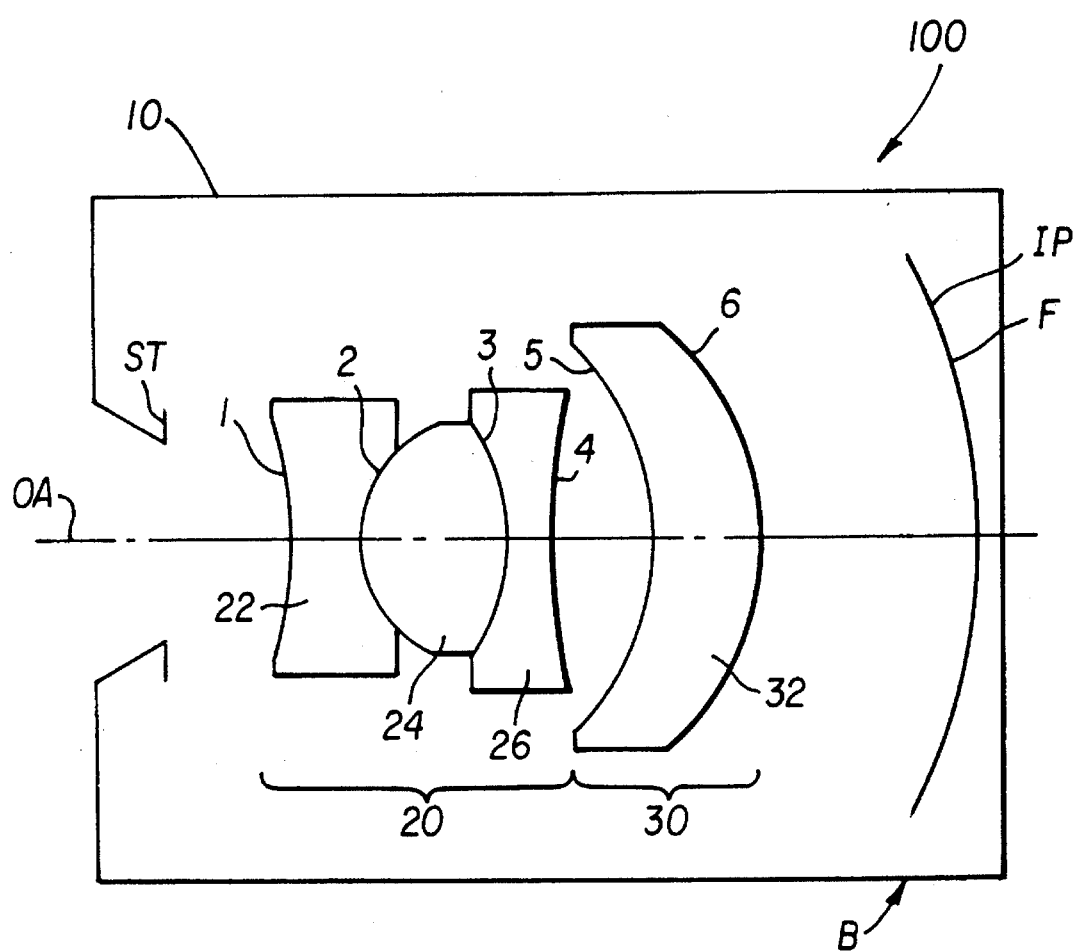

WIDE-ANGLE PHOTOGRAPHIC LENS SYSTEM AND A PHOTOGRAPHIC CAMERA

BACKGROUND OF THE INVENTION

1. Field of the Invention

The present invention relates to lens systems and particularly to lens systems suited for use in super wide-angle applications where the field angle is in excess of 90 degrees or 100 degrees. These lens systems are especially suitable for use in exposing film or other sensitive media in panoramic cameras.

2. Description of the Prior Art

Known super wide-angle lens designs utilize strong negative front lens groups that are followed by a stop and then an even stronger positive lens group to re-establish the effective focal length. Such designs are disclosed in U.S. Pat. Nos. 4,525,038; 4,431,273; 4,412,726; 4,381,888; and 3,045,547. The net result of this arrangement is an inverted telephoto effect (i.e. the back focus of the lens system is longer than the focal length). In addition, an exit pupil distance in this type of lens system is long enough to reduce the angle at which the principal ray strikes the image plane thus reducing the relative illumination fall-off due to cosine fourth effect. However, such lens systems tend to have lens elements with large diameters, many lens elements and high manufacturing costs.

Accordingly, it is the principal object of the present invention to provide an improved lens system having a wide angle side-to-side coverage, few lens components, smaller lens element diameters and reduced manufacturing costs.

It is another object of this invention to provide a lens system for consumer camera application that achieves good aberration control with only a few and preferably only two lens components.

SUMMARY OF THE INVENTION

Briefly described, according to one aspect of the present invention, a lens system comprises in order from the object side: an aperture stop; a front lens unit located behind the aperture stop, the front unit including a triplet, the triplet consisting of two negative power lens elements and a positive power lens element located between the negative power lens elements; and a rear lens unit located behind the front lens unit.

According to another aspect of the present invention, a lens system comprises in order: a cemented triplet component consisting of a front negative power lens element, a middle positive power lens element, and a rear negative power lens element; and a single positive meniscus lens element located behind the cemented triplet, the single meniscus lens element having its concave surface oriented towards said cemented triplet.

According to yet another aspect of the present invention, a photographic camera comprising: (a) a camera body; (b) a lens system including: (i) an aperture stop, (ii) a front lens unit located behind the aperture stop, the front lens unit including a triplet, the triplet consisting of two negative power lens elements and a positive power lens element located between the negative power lens elements, (iii) a rear lens unit located behind the front lens unit; and (c) a photosensitive medium for imaging onto by the lens system.

BRIEF DESCRIPTION OF THE DRAWINGS

The foregoing and other objects, features and advantages as well as the presently preferred embodiment thereof will become more apparent from reading of the following description in connection with the accompanying drawing which shows a top view in schematic of the lens system of the preferred embodiment.

DESCRIPTION OF THE PREFERRED EMBODIMENT

With reference to the accompanying drawing, a photographic camera 100 comprises a camera body B, a lens system 10 located within the body B and a photosensitive medium such as film F for the lens system 10 to image upon. The camera includes, as is well known, a shutter and controls for controlling an exposure duration and suitable means, not shown, for supporting the lens system and the film and means for advancing the film after each exposure. The camera may include other conventional features associated with known cameras including panoramic cameras. A lens system 10 comprises only two components, i.e., from an object side a front lens unit 20 having positive optical power and a rear lens unit 30 having positive or negative power. According to the preferred embodiment, the front lens unit 20 comprises three lens elements cemented together in a triplet configuration. These three lens elements are a front negative power lens element 22, a middle lens element 24 having positive optical power and a rear lens element 26 having negative optical power. The middle lens element 24 is a biconvex singlet to which the front lens element 22 and rear negative lens element 26 are cemented. The strongly concave surfaces 2 and 3 of the front and rear lens elements respectively are oriented towards respective convex surfaces of the middle lens element 24. The surfaces 2 and 3 have the same respective radii of curvature as that of the respective convex surfaces of the element 24 to which they are cemented to.

Rear lens unit 30 comprises a meniscus lens component in a form of a singlet lens element 32 which is located behind the front unit 20. According to the preferred embodiment, the power of the lens element 32 is positive. However, this lens element 32 may be constructed from a different optical material which may change the element's power from slightly positive to slightly negative. The lens element 32 has a concave surface 5 oriented towards and facing the front lens unit 20 and a convex surface 6 which is oriented towards and facing the film F.

The advantage of a cemented triplet in the front lens unit is the reduction in air glass surfaces that are normally detrimental to light transmission especially at the large incident angles exhibited in the preferred embodiment (where the field angle coverage is greater than 102 degrees). In addition, because the lens elements are cemented, the sensitivity of the lens system to tilts and decenters introduced during the manufacturing process is also reduced.

An aperture stop ST of the lens system 10 of the preferred embodiment is placed 0.55 mm in front of the front most surface (surface 1) of lens element 22 and it controls the illumination of the image plane IP. The distance to the aperture stop ST is measured from the vertex of that surface and along the optical axis.

The specific parameters of the lens system 10 of the preferred embodiment are shown in Table 1 below, where F No. denotes the F number, f denotes the focal length, ω denotes the half viewing angle, $f_B$ is the back focal length, r is the radius of curvature of the individual lens element surface, d is the thickness of an individual lens or the axial distance between the adjacent surfaces, n is the refractive index and v is the Abbe number of an individual lens element at the d-line.

TABLE 1

F No. = F/8.0 f = 14.99
ω = 51.10° (side-to-side) $f_B$ = 12.85

| Surface No. | r | d | n | v |
|---|---|---|---|---|
| 1 | −94.257 | 0.800 | 1.583 | 46.5 |
| 2 | 2.6257 | 1.775 | 1.788 | 47.4 |
| 3 | −2.6257 | 0.800 | 1.805 | 39.6 |
| 4 | 94.257 | 0.767 | | |
| 5 | ASPHERIC[1.] | 0.811 | 1.492 | 57.4 |
| 6 | −6.2213 | | | |

[1.]Aspheric Equation:

$$X = \frac{CY^2}{1 + \sqrt{1 - (k+1)C^2Y^2}} + DY^4 + EY^6 + FY^8 + GY^{10} + HY^{12} + IY^{14}$$

Surface 5  C = −0.1425049  D = −0.123598E−01  G = 0.1713240E−02
           k = 0.0000000   E = 0.933005E−02   H = −0.2729710E−03
                           F = −0.554000E−02  I = 0.1682503E−04

The image surface is cylindrical where the curvature C=−0.0172747, k= 7.01687 and D=0.2331943E−04.

As described above, the lens system of the invention has relatively few lens elements, may be constructed with as few as two lens components, is mechanically simple and has an additional advantage of providing a wide (side-to-side) field coverage. The lens system 10 has the same coverage as a typical 35 mm camera in one direction, but twice the coverage in the other direction (i.e. its side-to-side coverage is in excess of 90 degrees and preferably in excess of 100 degrees) and thus the lens system 10 is especially suitable for use in panoramic type cameras.

According to the invention, the image plane IP is a curved concave surface facing the object side and it is approximately cylindrical in shape (i.e. it is curved mostly in one plane). The curved image plane IP reduces the relative illumination fall-off that is experienced in super wide angle designs where the exit pupil remains relatively close to the image plane.

A further advantage of this lens system is that the front lens unit 20 has a symmetrical configuration—i.e. the external surface 1 and the external surface 4 of lens unit 20 have identical (in absolute values) radii of curvature as do internal surfaces 2 and 3. This feature reduces the cost of parts as well as the cost of assembly and testing.

Another advantage of the lens system of the preferred embodiment is that the lens system is achromatized for the wavelength region of 486–656 nm. This achromatization provides for superior optical performance with very few lens components.

This achromatization is achieved by choosing the appropriate indexes of refraction and v-numbers for the four lens elements, an example of which is provided in table 1. For achromatization purposes, it is preferred that one of the negative lens elements of the triplet has an Abbe number that is lower than that of the positive lens element of the triplet. It is also advantageous to have the indices of refraction of the triplet satisfy the following equation: $n_1 < n_2 < n_3$, where $n_1$, $n_2$ and $n_3$ are the respective indices of refraction of the three lens elements of this triplet. More specifically, $n_1$ is the index of refraction of the front negative power lens element 22, $n_2$ is the index of refraction of the positive lens element 24 and $n_3$ is the index of refraction of the negative power lens element 26. The requirement that $n_1$ is less than $n_2$ serves to control oblique spherical aberration, and in particular the upper rays (i.e., rays going through the upper portion of) the aperture for light bundles emanating from the far field (of view). Furthermore, it is preferable that $n_1 < n_2 < n_3$. This relationship is a factor for controlling the undesirable pincushion distortion inherent in providing a stop at the front of the lens system. The cemented triplet component represents most of the power contribution to the final focal length of the lens system, but the third and fifth order distortion contribution of the triplet component is negligible. In particular, group 20 has over 83% of the total power of the entire lens system 10. The result is a very wide angle camera objective with small distortion.

Finally, although a rear unit is shown in a preferred embodiment as a single meniscus lens component, the power of this component or element may be split to create multiple lens elements of various shapes. Either one or both of the lens units 20, 30 may be moved to provide focusing. In addition, more aspheric surfaces may be utilized to improve the system performance, if such is needed. An aspheric surface may be located on one of the elements of the front lens unit, preferably on the first or fourth surface. Placing an asphere on the front-most lens surface will help control spherical aberration and will allow the lens system to be made faster. Placing the asphere on the rear-most surface of the front lens unit will help to improve spherical aberration and will also allow the lens system to be used with a wider field angle. An aperture stop position may also be changed—it may be moved closer to the image surface in some applications. For example, it may be placed between the front and the rear lens units.

Further variations and modifications of the herein described system, within the scope of the invention will undoubtedly suggest themselves to those skilled in the art. Accordingly, the foregoing description should be taken as illustrative and not in a limiting sense.

The invention has been described in detail with particular reference to a preferred embodiment thereof, but it will be understood that variations and modifications can be effected within the spirit and scope of the invention.

What is claimed is:

1. A lens system comprising in order from an object side:

an aperture stop;

a front lens unit located behind said aperture stop, said front lens unit including a triplet, said triplet consisting of two negative power lens elements and a positive power lens element located between said negative power lens elements; and a rear lens unit located behind said front lens unit.

2. A lens system according to claim 1, wherein said triplet is a positive cemented triplet component.

3. A lens system according to claim 2, wherein said rear lens unit is a meniscus component having a concave surface oriented towards said front lens unit.

4. A lens system according to claim 1, wherein said rear lens unit is a single meniscus lens component.

5. A lens system according to claim 1, wherein a surface of a lens element in said lens system is an aspheric surface.

6. A lens system according to claim 5, wherein a front-most surface of said lens system is an aspheric surface.

7. A lens system according to claim 5, wherein one of the lens surfaces of said rear lens unit is an aspheric surface.

8. A lens system according to claim 2, wherein one surface of a lens element in said lens system is an aspheric surface.

9. A lens system according to claim 4, wherein a surface of a lens element in said lens system is an aspheric surface.

10. A lens system according to claim 9, wherein a front surface of said lens component comprising said rear lens unit is an aspheric surface.

11. A lens system according to claim 1, wherein the front lens unit is movable axially for focusing.

12. A lens system according to claim 1, wherein the rear lens unit is movable for focusing.

13. A lens system according to claim 12, wherein the rear lens unit is movable for focusing.

front lens unit is identical in absolute value to the radii of curvature of the rear-most surface of a rear lens element comprising said front lens unit; and the radii of curvature of the front and rear surfaces of said positive power lens element also have identical radii of curvature in absolute value.

19. A lens system comprising in order:
   a cemented triplet component consisting of a front negative power lens element, a middle positive power lens element, and a rear negative power lens element; and
   a single meniscus lens element located behind said cemented triplet, said single meniscus lens element having its concave surface oriented towards said cemented triplet.

20. A lens system according to claim 19 having an image plane that is a curved image surface and the curvature of the surface is sufficient to reduce relative illumination fall-off at the wide field angles.

21. A lens system according to claim 20, wherein said image surface is approximately cylindrical in shape.

22. A lens system according to claim 19, wherein a surface of a lens element in said lens system is an aspheric surface.

23. A lens system according to claim 22, wherein one of the lens surfaces of said meniscus lens element is an aspheric surface.

24. A lens system according to claim 7 having the following parameters:

| | F No. = F/8.0 f = 14.99 | | | |
| | $\omega$ = 51.10° (side-to-side) $f_B$ = 12.85 | | | |
| Surface No. | r | d | n | v |
| --- | --- | --- | --- | --- |
| 1 | −94.257 | 0.800 | 1.583 | 46.5 |
| 2 | 2.6257 | 1.775 | 1.788 | 47.4 |
| 3 | −2.6257 | 0.800 | 1.805 | 39.6 |
| 4 | 94.257 | 0.767 | | |
| 5 | ASPHERIC[1.] | 0.811 | 1.492 | 57.4 |
| 6 | −6.2213 | | | |

[1.]Aspheric Equation:

$$X = \frac{CY^2}{1 + \sqrt{1 - (k+1)C^2Y^2}} + DY^4 + EY^6 + FY^8 + GY^{10} + HY^{12} + IY^{14}$$

Surface 5  C = −0.1425049   D = −0.123598E−01   G = 0.1713240E−02
           k = 0.0000000    E = 0.933005E−02    H = −0.2729710E−03
                            F = −0.554000E−02   I = 0.1682503E−04.

14. The lens system of claim 1, wherein the lens system is achromatized for the wavelength region of about 486 nm to about 656 nm.

15. A lens system comprising in order from an object side:
   a front lens unit including a triplet, said triplet consisting of two negative power lens elements and a positive power lens element located between said negative power lens elements; and
   a rear lens unit located behind said front lens unit, said rear lens unit is a meniscus component having a concave surface oriented towards said front lens unit.

16. A lens system according to claim 15, wherein said lens elements comprising said triplet have powers and thickness sufficient to provide a full field coverage in excess of 90 degrees.

17. A lens system according to claim 15, wherein said front lens unit has a symmetrical configuration with respect to radii of curvatures.

18. A lens system according to claim 17, wherein the front-most surface of a front lens element comprising said 25. A lens system consisting in order:
   an aperture stop;
   a cemented triplet component consisting of a front negative power lens element, a middle positive power lens element, and a rear negative power lens element; and
   a single meniscus lens element located behind said cemented triplet, said single meniscus lens element having its concave surface oriented towards said cemented triplet.

26. A lens system comprising in order from an object side:
   an aperture stop;
   a front lens unit located behind said aperture stop, said front lens unit including a triplet, said triplet consisting of two negative power lens elements and a positive power lens element located between said negative power lens elements, wherein one of said negative lens elements of said triplet has an index of refraction that is lower than that of said positive lens elements of said triplet; and that at least one of said negative elements of said triplet has an Abbe number which is lower than the Abbe number of said positive lens element; and a rear lens unit located behind said front lens unit.

27. A lens system comprising in order from an object side:

an aperture stop;

a front lens unit located behind said aperture stop, said front lens unit including a triplet, said triplet consisting of two negative power lens elements and a positive power lens element located between said negative power lens elements, wherein $n_1<n_2<n_3$, where $n_1$ is the index of refraction of the front lens element comprising said triplet, $n_2$ is the index of refraction of the positive lens element of said triplet, $n_3$ is the index of refraction of the rear lens element of said triplet, and wherein one of said negative lens elements of said triplet has an Abbe number which is smaller than the Abbe number of the positive power lens element of said triplet; and a rear lens unit located behind said front lens unit.

28. A photographic camera comprising:
   (a) a camera body;
   (b) a lens system including:
      (i) an aperture stop,
      (ii) a front lens unit located behind said aperture stop, said front lens unit including a triplet, said triplet consisting of two negative power lens elements and a positive power lens element located between said negative power lens elements,
      (iii) a rear lens unit located behind said front lens unit; and
   (c) a photosensitive medium for imaging onto by said lens system.

29. A photographic camera comprising:
   (a) a camera body;
   (b) a lens system including:
      (i) a front lens unit including a triplet, said triplet being a positive power triplet, said triplet consisting of two negative power lens elements and a positive power lens element located between said negative power lens elements,
      (ii) a rear lens unit located behind said front lens unit said rear lens unit being a meniscus lens element having its concave surface oriented towards said triplet; and
   (c) a photosensitive medium for imaging onto by said lens system.

30. A photographic camera comprising:
   (a) a camera body;
   (b) a lens system including:
      (i) a cemented triplet component consisting of a front negative power lens element, a middle positive power lens element, and a rear negative power lens element,
      (ii) a single meniscus lens element located behind said cemented triplet, said single meniscus lens element having its concave surface oriented towards said cemented triplet; and
   (c) a photosensitive medium for imaging onto by said lens system.

31. A photographic camera according to claim 30, wherein said photosensitive medium is curved in a generally cylindrical shape at the image plane of the lens system.

32. A photographic camera according to claim 31, wherein the format of said photosensitive medium can accommodate at least a 90 degree full field of view in at least one direction.

* * * * *